US012680468B2

(12) United States Patent
Tripathi et al.

(10) Patent No.: US 12,680,468 B2
(45) Date of Patent: Jul. 14, 2026

(54) AIRCRAFT ENGINE STARTER HAVING AN INTEGRATED DATA ACQUISITION SYSTEM

(71) Applicant: Unison Industries, LLC, Jacksonville, FL (US)

(72) Inventors: Pallavi Tripathi, Bengaluru (IN); Nagendra Baddam, Bengaluru (IN); Shiloh Montegomery Meyers, Miamisburg, OH (US); Brian Christopher Kemp, Troy, OH (US); Domala Uma Maheshwar, Bengaluru (IN)

(73) Assignee: Unison Industries, LLC, Jacksonville, FL (US)

( * ) Notice: Subject to any disclaimer, the term of this patent is extended or adjusted under 35 U.S.C. 154(b) by 286 days.

(21) Appl. No.: 18/508,993

(22) Filed: Nov. 14, 2023

(65) Prior Publication Data

US 2025/0243777 A1 Jul. 31, 2025

(51) Int. Cl.
*F01D 19/00* (2006.01)

(52) U.S. Cl.
CPC ........ *F01D 19/00* (2013.01); *F05D 2220/323* (2013.01); *F05D 2220/76* (2013.01); *F05D 2260/80* (2013.01); *F05D 2260/85* (2013.01)

(58) Field of Classification Search
CPC ............... F01D 19/00; F05D 2220/323; F05D 2220/76; F05D 2260/80; F05D 2260/85; F02C 7/277; F02C 7/26; F02C 7/268; F02C 9/00
See application file for complete search history.

(56) References Cited

U.S. PATENT DOCUMENTS

| | | | | |
|---|---|---|---|---|
| 8,838,359 | B2 | 9/2014 | Qiu et al. | |
| 8,918,297 | B2 | 12/2014 | Nakagawa | |
| 9,507,982 | B2 | 11/2016 | Mylaraswamy | |
| 9,797,328 | B2 | 10/2017 | Martinez et al. | |
| 10,266,278 | B2 | 4/2019 | Kemp et al. | |
| 10,270,482 | B2 | 4/2019 | Dishon et al. | |
| 10,598,095 | B2 | 3/2020 | Kemp et al. | |
| 11,453,511 | B1 | 9/2022 | Moeykens et al. | |
| 2005/0075769 | A1 * | 4/2005 | Eschborn | 701/29 |
| 2017/0370294 | A1 | 12/2017 | Gentile | |
| 2018/0178925 | A1 * | 6/2018 | Kemp | B64D 45/00 |
| 2019/0017484 | A1 | 1/2019 | Blanco | |
| 2019/0226405 | A1 * | 7/2019 | Kelly | F01D 25/34 |
| 2020/0290750 | A1 | 9/2020 | Ferrell et al. | |
| 2021/0301727 | A1 * | 9/2021 | Asdev | F02C 7/277 |
| 2023/0015710 | A1 | 1/2023 | Moeykens et al. | |

* cited by examiner

*Primary Examiner* — Russell Frejd
*Assistant Examiner* — Brittany Renee Peko
(74) *Attorney, Agent, or Firm* — McGarry Bair PC

(57) ABSTRACT

An air turbine starter system of an aircraft includes an air turbine starter having a data acquisition system disposed thereon. The data acquisition system includes a data acquisition controller, a memory device, and a set of starter sensors.

20 Claims, 4 Drawing Sheets

AIRCRAFT ENGINE STARTER HAVING AN INTEGRATED DATA ACQUISITION SYSTEM

TECHNICAL FIELD

This disclosure relates generally to aircraft, and more specifically to aircraft engine starters having an integrated data acquisition system.

BACKGROUND

An aerial vehicle or aircraft can use an air turbine starter to start an engine. An air turbine starter can include an air turbine motor, a speed reducer, and a clutch. A starter air valve is typically used to provide a fluid to the air turbine starter. The air turbine motor converts energy from the fluid supplied by the starter air valve to a high-speed rotation energy. The speed reducer converts the high speed, low torque input to a low speed, high torque output usable by the engine. The clutch allows for the de-coupling of the air turbine motor and speed reducer from the engine during normal engine operation.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
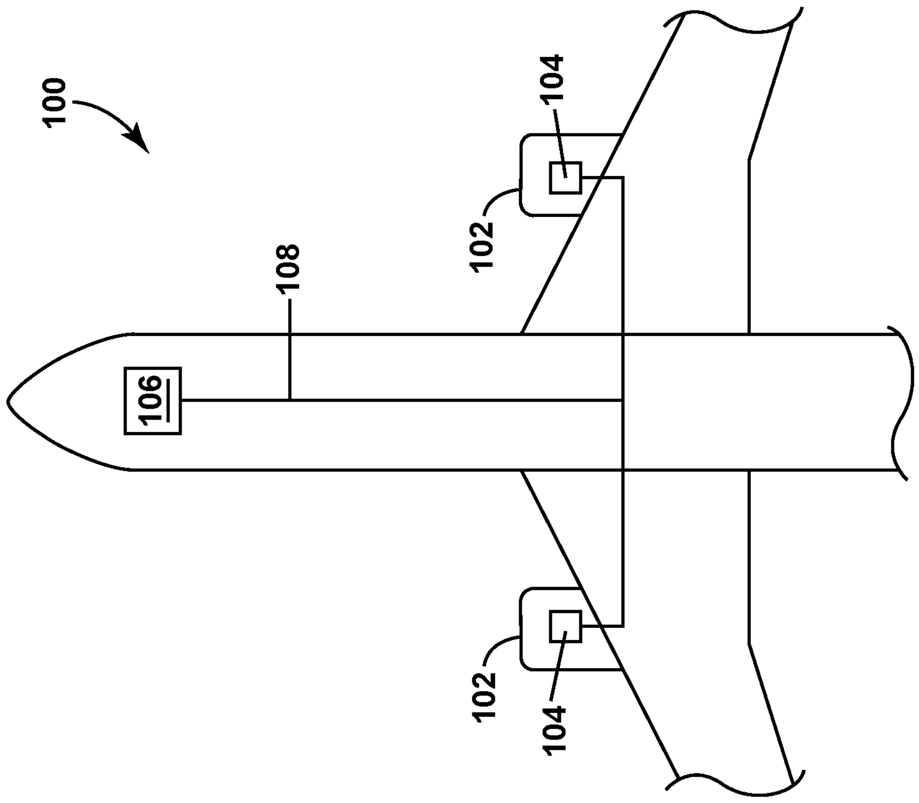
FIG. 1 depicts an example aircraft in accordance with aspects as described herein.

Aspects of the present disclosure are directed to an air turbine starter (ATS) system including an ATS with an integrated data acquisition (DAQ) system. It will be understood that the disclosure can have applicability to provide benefits in industrial, commercial, and residential applications that use or require data acquisition. For example, while the exemplary aspects described are directed to the application of an aircraft turbine engine and an ATS, the aspects as disclosed herein can be applied to any implementation of a driving mechanism that generates rotational motion at a driving output and provides the rotational motion to another piece of rotating equipment. For purposes of illustration, the present disclosure will be described with respect to an ATS system for an aircraft turbine engine, however, the ATS can have various applications including starting any gas turbine engine.

The exemplary drawings are for purposes of illustration only and the dimensions, positions, order, and relative sizes reflected in the drawings attached hereto can vary.

As used herein, the term "exemplary" means "serving as an example, instance, or illustration." Any aspect described herein as "exemplary" is not necessarily to be construed as preferred or advantageous over other implementations. Additionally, unless specifically identified otherwise, all aspects described herein should be considered exemplary.

As used herein, terms such as "first", "second", "third", and the like, may be used interchangeably to distinguish one component from another and are not intended to signify location or importance of the individual components.

As used herein, the term "set" or a "set" of elements can be any number of elements, including only one.

As used herein, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements.

As used herein, the terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite a fluid flow direction, and the term "downstream" refers to a direction that is in the same direction as the fluid flow.

As used herein, the term "thermally insulative" refers to a property of a material that exhibits a low thermal conductivity (for example, less than about 200 watts per meter-Kelvin (W/(mK)).

As used herein, the term "thermally insulative layer" refers to a thermally insulative material or element that operates at elevated temperatures or in an environment with elevated temperatures. That is, a thermally insulative layer is a material, or structure having a relatively low thermal conductivity (e.g., below 200 W/mK) arranged to resist or retard a flow of heat therethrough.

As used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, a signal indicative of the value can be provided to a controller module or processor, and the controller module or processor can perform processing on the signal to determine a representative value or an electrical characteristic representative of said value.

As used herein, a "controller" or "control module" can include a component configured or adapted to provide instruction, control, operation, or any form of communication for operable components to affect the operation thereof. A controller module can include, without limitation, any known processor, microcontroller, System-on-Chip (SoC), or logic devices. Such logic devices can include but are not be limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (PC), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. As used herein, the terms "program code", executable code", "software", and "firmware" can be used interchangeably, and can be used to describe operable or executable instruction sets that can include routines, programs, code, bit streams, objects, components, data structures, algorithms, etc., that have the technical effect of performing particular tasks or implementing particular abstract data types. When implemented in software or firmware, various aspects as described herein can include code segments or instructions that perform the various tasks. It should be appreciated that the various block components shown in the figures can be realized by any number of hardware, software, or firmware components, or combinations thereof, configured to perform the specified functions.

In another non-limiting example, a controller can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Conventional DAQ systems or data measurement systems are primarily used in a wide variety of applications for sensing a physical phenomenon or parameter (such as temperature or pressure) and producing an electrical signal indicative of a current value (e.g., a magnitude or frequency) of the parameter, processing the electrical signal in order to extract information, and saving the information to a memory for analysis.

A typical DAQ system includes a computer communicatively coupled to a measurement device. The measurement device can be a computer-based instrument, a data acquisition device or board, a programmable logic device (PLD), an actuator, a sensor, transducer, or other type of device for measuring, sensing, acquiring, or generating data. For example, the measurement device may be a sensor communicatively coupled to an input/output (I/O) slot of the computer system. Typically, the measurement device is coupled to the computer system through a PCI bus, PXI (PCI extensions for Instrumentation) bus, a USB (Universal Serial Bus), a GPM (General-Purpose Interface Bus), a VXI (VME extensions for Instrumentation) bus, a serial port, parallel port, or Ethernet port of the computer system.

In some conventional DAQ systems, in operation, the electrical signal provided by the sensor is an analog signal which is provided by the sensor to a digitizer, which may reside in a DAQ device or instrumentation device. The analog signal can be converted to digital data (possibly after being conditioned) by an Analog-to-Digital Converter (ADC), and transmitted to the computer system for storage and/or analysis.

Conventional aircraft often employ DAQ systems and can include any number of devices or modules configured to capture data indicative of any desired number of parameters relative to the aircraft's operational performance. Aircraft DAQ systems are typically part of, or integrated into, the aircraft's computer (e.g., a flight computer or FADEC) installed in the aircraft (e.g., in the cockpit). The aircraft computer typically includes a data acquisition controller portion having a memory that is communicatively coupled to a relatively large number of sensors or other measurement devices positioned throughout the aircraft. The sensors sense, detect, measure, or otherwise acquire respective flight parameter data, and generate a respective signal indicative of a value of the sensed flight parameter. For example, some conventional aircraft DAQ systems monitor specific aircraft performance parameters such as, without limitation, altitude, airspeed, heading, vertical acceleration, time, nose heading, steering wheel position, rudder pedal position, steering wheel position, horizontal stabilizer position, ambient temperature, and fuel flow. The sensors are typically communicatively coupled to the aircraft computer via a communication network of the aircraft. The aircraft computer receives the signals indicative of a sensed flight parameter from the sensors in accordance with known communication protocols (e.g., Time Sensitive Network (TSN) or Time Triggered Ethernet (TTE)). The values are stored in the memory (e.g., the aircraft computer memory) for access by a computing device for analysis either during a flight, after the flight, or both.

However, in modern aircraft, the bandwidth of the communication network can practically limit the number of sensor devices coupled to the communication network, and the amount of data transmitted. Additionally, due in part to the large number of dedicated communications lines, it can be particularly challenging to add new sensors (e.g., via a retrofit) that may be included with new or replacement equipment (e.g., a line replaceable unit (LRU), such as an air turbine starter) for an aircraft. It would be desirable to enable operational data capture or collection for an air turbine starter while reducing or eliminating the demands on the bandwidth of the communication network of the aircraft as compared to conventional techniques.

Conventional air turbine starters, such as for aircraft, include many moving parts such as high-speed bearings and other moving components subject to operational stress and wear. However, these conventional air turbine starters typically lack integrated data acquisition and analysis, such as for advance fault detection, safety alerts (e.g., to a pilot or flight crew), or preventive maintenance projections. It would be desirable to enable automatic continuous or periodic data collection during an operation of air turbine starter components and further enable real-time and/or subsequent analysis of the collected data to determine any anomalies associated with the air turbine starter and provide a notification indicative of any anomaly to a controller device for the aircraft. It would also be desirable to enable analysis of the collected data to identify trends in the data (e.g., indicative of premature wear) or to predict end of life of these components (e.g., bearings) to avoid in-field failure of the air turbine starter.

Furthermore, with a conventional centralized DAQ system arranged as part of an aircraft computer system, it can be challenging to segregate and provide saved data relating to a particular device (e.g., an air turbine starter) to a manufacturer or servicer of the device. For example, it would be desirable to enable a manufacturer or servicer of an air turbine starter device to have performance or operational data related to the device readily and physically available with the device itself without need to additionally or separately obtain the operational data from the aircraft computer.

Exemplary aspects of the present disclosure are directed to devices and systems associated with an air turbine starter having an integrated DAQ system disposed thereon, such as for an aircraft. For instance, the air turbine starter and DAQ system can be co-located within a common housing installed on the aircraft. The air turbine starter is operative to start an engine of the aircraft. A starter air valve can provide fluid (e.g., motive air, gases, other fluids, etc.) to the air turbine starter. The air turbine starter can convert the fluid provided to torque energy usable by the engine. The DAQ system can be arranged to operate independently of the aircraft computer systems or other DAQ systems of the aircraft. Other exemplary aspects can be communicatively coupled to the aircraft computer, but can reduce the amount of data to be transmitted on the communication network of the aircraft as compared to conventional techniques, thereby reducing bandwidth demands and/or the need for dedicated communication lines. Accordingly, aspects of the present disclosure can be implemented in retrofit or field replacement applications more readily than conventional air turbine starters coupled to a typical DAQ system.

Aspects of the present disclosure further include a memory device to store operational or performance data such as values of sensed parameters related to the air turbine starter. In some aspects, the memory device can be portable or removeable (e.g., a flash memory) from the air turbine starter to enable analysis of the operational or performance data remote from the aircraft and/or starter without need to additionally download or access data from the aircraft computer.

The DAQ system as disclosed herein can further include a data analytics module configured to process or perform an analysis of the operational data. The data analytics module can process or perform the analysis during operation of the air turbine starter (e.g., during an aircraft engine start-up) or at any other desired time (e.g., during a maintenance or repair of the air turbine starter). Additionally, aspects as disclosed herein enable the analysis of the operational data post-operation and/or remote from the starter (e.g., in a repair facility). Furthermore, aspects as disclosed herein can provide alerts or notifications to a pilot or flight crew of predetermined conditions (e.g., a high operating temperature).

FIG. 1 depicts an aircraft 100 according to example embodiments of the present disclosure. The aircraft 100 can include one or more engines 102. In some implementations, at least one of the one or more engines 102 can be configured as one or more gas turbine engines. For example, the one or more engines 102 can include a compressor section, a combustion section, and a turbine section in serial flow order. One or more of the one or more engines 102 can be configured as a turbofan engine, a turbojet engine, a turboprop engine, a turboshaft engine, etc. In other implementations, one or more of the one or more engines 102 can be an internal combustion engine, or any other suitable engine for use in an aircraft. The one or more engines 102 can include or be coupled to one or more air turbine starters 104, as described in more detail below. The one or more air turbine starters 104 can communicate with an aircraft controller 106, (e.g., a computerized controller device), via a communication path 108. The aircraft controller 106 can be a computerized aircraft controller, for example, a FADEC, or an aircraft computer, or other computing device. The communication path 108 can be, for example, a communication bus, such as an aircraft communication bus.

The aircraft controller 106 can include a memory 107. The aircraft controller 106 memory can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. The aircraft controller 106 includes one or more controller modules or processors, which can be running any suitable programs. It will be understood that the aircraft controller 106 includes or is associated with any suitable number of individual microprocessors, power supplies, storage devices, interface cards, auto flight systems, flight management computers, controller modules, and other standard components and that the aircraft controller 106 can include or cooperate with machine executable code, any number of software (also sometimes called "firmware") programs (e.g., flight management programs), or other instructions designed to carry out the various methods, process tasks, calculations, and control/display functions necessary for operation of the aircraft 100. While not illustrated, it will be understood that any number of sensors or other systems can also be communicatively or operably coupled to the aircraft controller 106 to provide information thereto or receive information therefrom.

The aircraft controller 106 can be configured to control an operation of the one or more air turbine starters 104. For example, in operation, the aircraft controller 106 can be configured to provide control signals to one or more of the air turbine starters 104. In some aspects, the aircraft controller 106 can be configured as an open-loop controller which does not receive feedback. While aspects of the operation the air turbine starter 104 are described herein for ease of description and understanding as being controlled by the aircraft controller 106 (e.g., the aircraft computer or FADEC), other aspects are not so limited and other controllers can be used to control an operation of the air turbine starter 104. For example, it is contemplated that in some aspects, the air turbine starter 104 can include a starter controller. For instance, the starter controller can be located within a common housing with the starter air valve and/or the air turbine starter 104. The starter controller can be configured to provide control signals to one or more elements (e.g., the starter air valve) of the air turbine starter 104 to control an operation thereof.

The numbers, locations, and/or orientations of the components of example aircraft 100 are for purposes of illustration and discussion and are not intended to be limiting. Those of ordinary skill in the art, using the disclosures provided herein, shall understand that the numbers, locations, and/or orientations of the components of the aircraft 100 can be adjusted without deviating from the scope of the present disclosure. Furthermore, the one or more engines 102, as described herein, are meant as non-limiting examples, and other architectures are possible, such as, but not limited to, a steam turbine engine, a supercritical carbon dioxide turbine engine, or any other suitable turbine engine.

Figure 2:
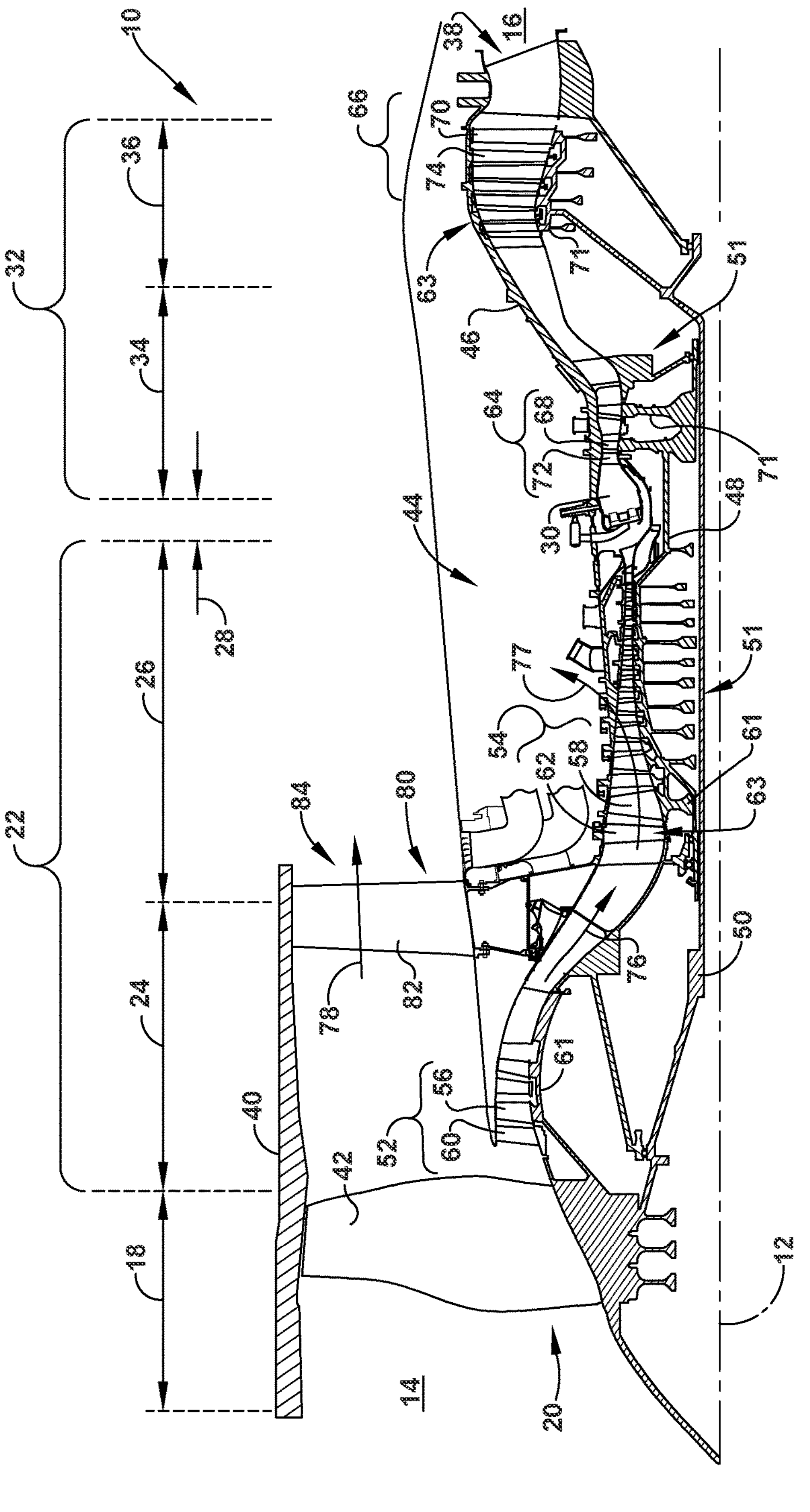
FIG. 2 is a schematic cross-sectional view of a gas turbine engine in accordance with aspects as described herein.

FIG. 2 is a schematic cross-sectional diagram of a gas turbine engine 10 for an aircraft. For example, the gas turbine engine 10 can be implemented as one of the engines 102 on the aircraft 100 of FIG. 1. The gas turbine engine 10 has a generally longitudinally extending axis or engine centerline 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. A fan inlet 83 of the fan section 18 is defined at the upstream or forward end 14 of the gas turbine engine 10. A fan exhaust 84 is defined downstream end of the fan inlet 83. The HP compressor 26, the combustor 30, and the HP turbine 34 form a core 44 of the gas turbine engine 10, which generates combustion gases. The core 44 is surrounded by a core casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a compressor disk 61, which is mounted to the corresponding one of the HP and LP spools 48, 50, with each stage having its own compressor disk 61. The blades 56, 58 may be part of a blisk, rather than being mounted to a disk. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to corresponding sets of static turbine vanes 72, 74, to extract energy from the stream of fluid passing through the turbine stage 64, 66. In a single turbine stage 64, 66, multiple turbine blades 68, 70 can be provided in a ring and can extend radially outwardly relative to the engine centerline 12, from a blade platform to a blade tip, while the corresponding turbine vanes 72, 74 are positioned upstream of and adjacent to the rotating turbine blades 68, 70. The turbine blades 68, 70 and the turbine vanes 72, 74 can be airfoil shaped. It is noted that the number of blades, vanes, and turbine stages shown in FIG. 1 were selected for illustrative purposes only, and that other numbers are possible.

The turbine blades 68, 70 for a stage of the turbine can be mounted to a turbine disk 71, which is mounted to the corresponding one of the HP and LP spools 48, 50, with each stage having a dedicated turbine disk 71. The vanes 72, 74 for a stage of the compressor can be mounted to the core casing 46 in a circumferential arrangement.

Complimentary to the rotor portion, the stationary portions of the gas turbine engine 10, such as the vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bypass cooling air 77, sometimes referred to as bleed air. The bypass cooling air 77 can be drawn from the pressurized airflow 76 and provided to engine components requiring cooling. The temperature of pressurized airflow 76 entering and exiting the combustor 30 is significantly increased. As such, cooling provided by the bypass cooling air 77 is supplied to downstream turbine components (e.g., a blade 68) being subjected to the heightened temperature environments.

A remaining portion of the airflow exiting the fan section, called a bypass airflow 78, bypasses the LP compressor 24 and engine core 44 and exits the gas turbine engine 10 through a stationary vane row, and more particularly an outlet guide vane assembly 80, comprising a plurality of airfoil guide vanes 82, at the fan exhaust 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 3:
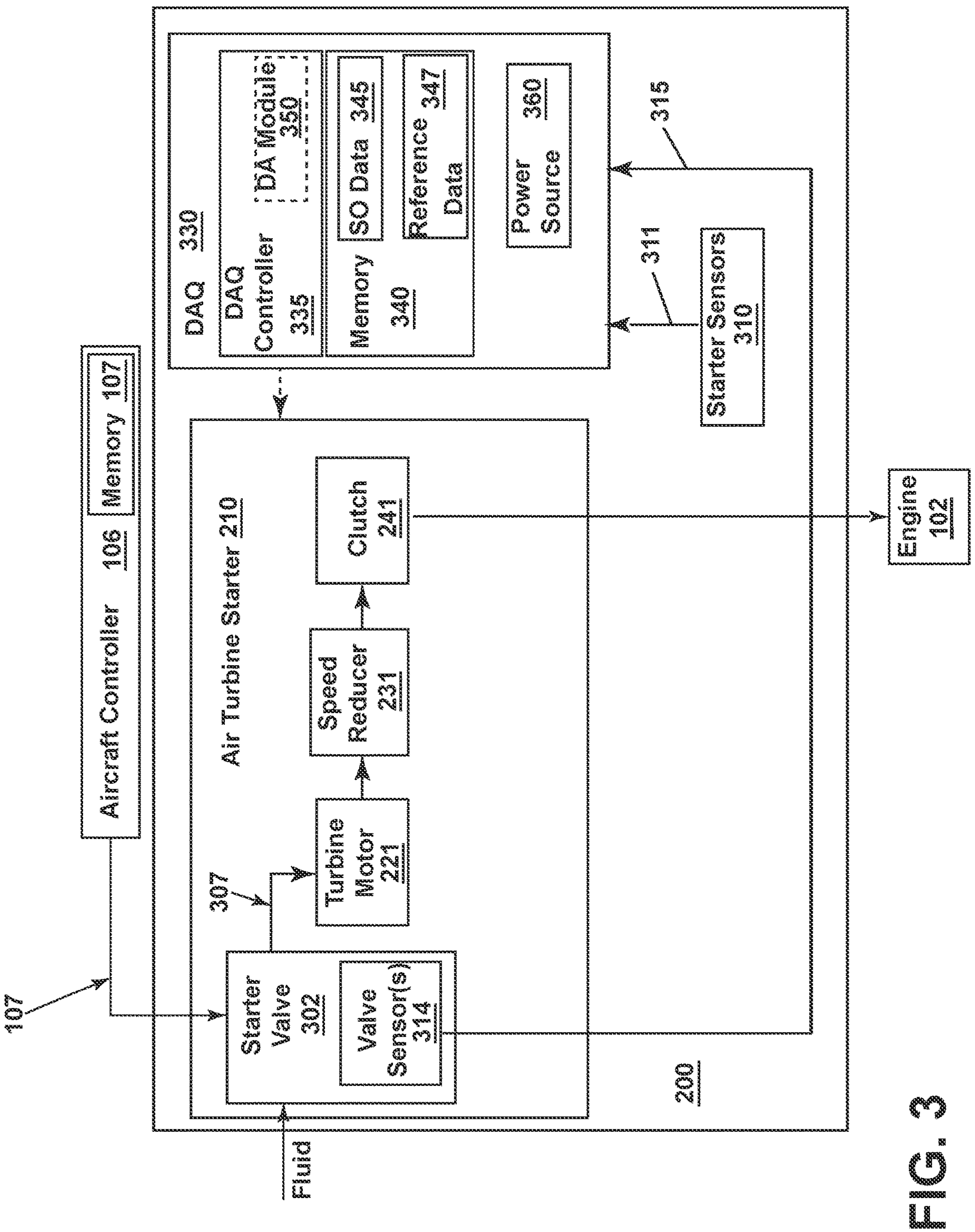
FIG. 3 depicts a functional block diagram of an air turbine starter system having an integrated data acquisition system, in accordance with aspects as described herein.

FIG. 3 depicts a block diagram of an air turbine starter system 200 in accordance with a non-limiting aspect of the present disclosure. The air turbine starter 210 can be in and/or coupled to the engine 102 of FIG. 1. The air turbine starter system 200 includes an air turbine starter 210. The air turbine starter 210 can include, in downstream serial flow relationship, a turbine motor 221, a speed reducer 231, and a clutch 241. The air turbine starter 210 is coupleable to the engine 102. For example, the clutch 241 can be arranged to selectively and rotatably engage with the rotor 51 (FIG. 2) of the engine 102, such as via a drive shaft or gearbox. The air turbine starter 210 can include a DAQ system 330 disposed thereon, communicatively coupled to a set of starter sensors 310. In some aspects, the DAQ system 330 is coupled to a housing (e.g., the housing 212 shown in FIG. 4) of the air turbine starter 210. The DAQ system 330 includes a DAQ controller 335, a power source 360, and a DAQ memory device 340. The DAQ memory device 340 can store, among other things, a set of air turbine starter operational (SO) data 345 and a set of predetermined reference data 347. In non-limiting aspects, the DAQ controller 335 can include, or be communicatively coupled to, a data analytics (DA) module 350. The starter sensors 310 can be communicatively coupled to the DAQ controller 335. The DAQ system 330 is integrated with the air turbine starter 210. For instance, the DAQ system 330 and the air turbine starter 210 can be cooperatively located within a common housing.

In non-limiting aspects, the air turbine starter system 200 can include, or be coupled to, a starter air valve 302. Optionally, in such aspects, the starter sensors 310 can include a set of valve sensors 314. The starter air valve 302 can be mechanically coupled to the air turbine starter 210. The starter air valve 302 can be communicatively coupled with the aircraft controller 106 (e.g., a FADEC). In some aspects, the aircraft controller 106 can be configured to control an operation (e.g., an opening and closing) of the starter air valve 302.

The DAQ controller 335, or DA module 350, or both, can include one or more controller modules or processors, which can run or execute any suitable programs. It will be understood that the DAQ controller 335 or DA module 350, or both, can include or be associated with any suitable number of individual microprocessors, power supplies, storage devices, interface cards, computers, controller modules, and other standard components. The DAQ controller 335 or DA module 350, or both, can include or cooperate with machine executable code, any number of software (also sometimes called “firmware”) programs (e.g., data acquisition and analysis programs), or other instructions designed to carry out the various methods, process tasks, calculations, and control/display functions necessary for operation of the DAQ system 330, or DA module 350, or both. In non-limiting aspects, the DA module 350, or DA module 350, or both, can comprise machine executable code, or software programs installed on the DAQ controller 335, or DA module 350, or both, or stored in the DAQ memory device 340. In non-limiting aspects, the DA module 350 can include a dedicated processor. The DA module 350, or DA module 350, or both, can be arranged to receive data from the DAQ memory device 340. The DAQ memory device 340 can include transition, volatile or non-transient, or non-volatile memory. In some aspects, the DAQ memory device 340 can be fixed to the air turbine starter 210. In other non-limiting aspects, the DAQ memory device 340 can be removeable (e.g., a portable memory device) from the air turbine starter 210. Additional non-limiting examples of the DAQ memory device 340 can include Random Access Memory (RAM), Read-Only Memory (ROM), flash memory, or one or more different types of portable electronic memory, such as a flash drive, Universal Serial Bus (USB) drives, and the like, or any suitable combination of these types of memory. In Additionally, the DAQ memory 340 can store various data, data types, sensed or measured data values, inputs, generated or processed data, or the like, accessible by the DAQ controller 335 in providing instruction, control, or operation to affect a functional or operable outcome, as described herein.

The DA module 350, or DA module 350, or both, is/are configured to process or perform an analysis of the data received from the DAQ memory device 340. The DA controller 335 can be configured to receive or collect data at least during an operation of the air turbine starter 210. The analysis of the data can be performed by the DA module 350 during the operation of the air turbine starter 210 (e.g., pre-flight), during a flight, post-flight, or a combination thereof.

In one non-limiting example, the executing instructions can include performing an analysis such as by a comparing of a first value with a second value, and operating or controlling operations of additional components based on the comparison. For example, when a sensed, measured, or provided value is compared with another value (e.g., a stored or predetermined value), a satisfaction of that comparison can result in actions, functions, or operations controllable by the DAQ controller 335. As used, the term “satisfies” or “satisfaction” of the comparison is used herein to mean that the first value satisfies the second value, such as being equal to or greater than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

The DAQ controller 335, or DA module 350, or both, can also include a communication interface used to communicate, for example, with the other components of the DAQ system, or the aircraft controller 106, or both. The communication interface can include any suitable components for interfacing with one or more network(s), including for example, transmitters, receivers, ports, controllers, antennas, or other suitable components.

The DAQ memory device 340 is communicatively coupled to the DAQ controller 335, the DA module 350, or both. The DAQ memory device 340 can include Random Access Memory (RAM), Read-Only Memory (ROM), flash memory, and the like. In non-limiting aspects, the DAQ memory device 340 can be a portable memory device. For example, the DAQ memory device 340 can include or more different types of portable electronic memory, such as discs, Digital Versatile disks (DVD), Compact Disc-Read-Only Memory (CD-ROMs), etc., or any suitable combination of these types of memory. The DAQ memory device 340 can store various data, data types, sensed or measured data values, inputs, generated or processed data, or the like, accessible by the DAQ controller 335, or the DA module 350, or both in providing instruction, control, analysis, computation, or operation to effect a functional or operable outcome, as described herein.

For example, the DAQ memory device 340 can store the SO data 345 and reference data 347 accessible by the DAQ controller 335, or the DA module 350, or both. The SO data 345 can include data sensed by the starter sensors 310 or set of valve sensors 314 and any other data associated with aircraft 100, as described herein. The SO data 345 and predetermined reference data 347 can include one or more table(s), function(s), algorithm(s), model(s), equation(s), etc. for use by the DAQ controller 335 or DA module 350 or both.

The set of starter sensors 310 can include any number of starter sensors 310 arranged in signal communication with the DAQ controller 335. The set of starter sensors 310 can be configured to measure, detect, or otherwise sense a respective predetermined operating parameter of the air turbine starter 210. The set of starter sensors 310 are further configured to provide respective starter sensor signals 311 indicative of a respective value (e.g., a magnitude, a frequency, a count, etc.) of the sensed operating parameter (e.g., a temperature, a force, etc.) associated with the air turbine starter 210 to the DAQ controller 335. For example, a particular starter sensor 310 can be arranged to provide a respective starter sensor signal 311 indicative of a parameter (e.g., a temperature) associated with a bearing within the housing 212 of the air turbine starter 210. In another instance, a particular starter sensor 310 can provide a respective starter sensor signal 311 indicative of a frequency (e.g., indicative of a vibration) associated with the bearing. The values of the sensed parameters can be indicative of a condition or operational performance of the air turbine starter 210. The set of starter sensors 310 can include any desired sensing device including, without limitation, an accelerometer, a thermocouple, a motion sensor, a microphone, a force sensor, a pressure sensor, a proximity sensor, a counter, and the like, or combinations thereof. The set of starter sensors 310 can be selected and arranged to measure or sense any desired parameter, including, without limitation, mechanical vibration, mechanical force, rotational speed, acceleration, temperature, vibration, force, pressure, frequency, sound, number of operations, and the like, or combinations thereof.

The set of valve sensors 314 can include any number of valve sensors 314 arranged in signal communication with the DAQ controller 335, the aircraft controller 106, or both. The set of valve sensors 314 can be configured to measure, detect, or otherwise sense a respective predetermined parameter. The set of valve sensors 314 can be further configured to provide respective valve sensor signals 315 indicative of a respective value of the sensed parameter to the DAQ controller 335, or the aircraft controller 106, or both. The set of valve sensors 314 can include, for example, a pressure gauge, a vacuum gauge, a manometer, and the like, or combination thereof. The set of valve sensors 314 can measure pressure or temperature, or both. The measured pressure and/or temperature can be indicative of a condition of the starter air valve 302. Collectively, the values indicated by the valve sensor signals 315, or the valve sensor signal 315, or both, can define the SO data 345.

It will be appreciated that the foregoing exemplary listing of starter sensors 310 and valve sensors 314 is given by way of example, and other aspects are not so limited. In various other aspects, any number of starter sensors 310 and valve sensors 314 can be arranged and disposed to provide a respective starter sensor signal 311, and valve sensor signal 315 that is indicative of any desired parameter without departing from the scope of the disclosure herein.

The power source 360 is electrically coupled to the DAQ controller 335, the DA module 350, or the DAQ memory device 340, or combinations thereof, and configured to provide electrical power thereto. The power source 360 can be a limited supply power source. As used herein, a "limited supply power source" includes any power source that is limited in supplying an amount or quantity of power over a period of time by way of, for example, a discharge cycle of operation. The power source 360 can include, but is not limited to, fuel cell systems, hydrogen cell systems, capacitors, super capacitors, battery systems, rechargeable systems such as solar or photovoltaic cells, banks of any of the preceding examples, or combinations thereof.

Additionally, or alternatively, in non-limiting aspects, the power source 360 can be a constant power source. As used herein, a "constant power source" includes power sources that are capable or configured to generate a predicted or predetermined quantity of power during expected operation. In one non-limiting example, the power source 360 can include an electrical generator or generator system that generates electrical power in response to kinetic motion (e.g., a rotation of a shaft)). In some non-limiting aspects, the generator can include an eddy current generator.

In operation, the aircraft controller 106 can control an operation of the air turbine starter 210. For example, the aircraft controller 106 can control a rate of opening, or a percentage open, or both, of the starter air valve 302. The starter air valve 302 controls the flow of a fluid (e.g., pressurized air) to the turbine motor 221. The higher percentage the controller is open, the more fluid can be provided to the air turbine starter 210. For example, the aircraft controller 106 can cause the starter air valve 302 to open and shut at a rate of twice per second, or any other rate. In another non-limiting instance, the aircraft controller 106 can cause the starter air valve 302 to selectively operate between a fully closed state (e.g., 0% open) to a fully open state (e.g., 100% open), or at any other desired percentage open (e.g., between 0% and 100% open). Changing the rate of opening and/or the percentage open of the starter air valve 302 can modify the fluid provided to the air turbine starter 210 from the starter air valve 302.

With simultaneous reference to FIG. 2 and FIG. 3, in an operation of the air turbine starter system 200, the starter air valve 302 can receive a command signal 107 from the aircraft controller 106. The starter air valve 302 can regulate a fluid flow 307 (e.g., an air flow) to the turbine motor 221 based on the command signal 107. For example, in one non-limiting instance, the fluid flow 307 can be supplied as bleed air from an auxiliary power unit (APU) of the engine 102. In other instances, the fluid flow 307 can be provided as cross-bleed air from another engine on the aircraft 10. In still other instances, the fluid flow 307 can be provided from a stored air cart (sometimes called a "start cart") separate from the aircraft 10. Regardless of the source of the fluid flow 307, the air turbine starter 210 converts energy from the fluid flow 307 provided to the air turbine starter 210 from the starter air valve 302 to a torque output usable for starting the engine 102. For example, the turbine motor 221 can convert energy from the fluid flow 307 supplied by the starter air valve 302 to a high-speed rotation energy. The speed reducer 231 converts the rotation energy (e.g., high speed, low torque) from the turbine motor 221 into lower speed, (e.g., low-speed, high torque) rotation energy used to rotate the clutch 241. The rotating clutch 241 is used to engage with and drive a rotation of the engine 102. For example, in one particular instance, the clutch 241 is selectively engageable with the rotor 51 of the engine 102 via a drive shaft rotatably coupled to an accessory gearbox. As the air turbine starter 210 drives a rotation of the engine 102, fuel is added to the combustor 30 and ignited thereby generating combustion gases which further drive the rotation of the engine 102. The air turbine starter 210 cooperatively continues to drive the rotation of the engine 102 until a predetermined rotational speed (e.g., 4000 revolutions per minute) sometimes called a "cut-out speed" of the rotor 51 is reached. When the engine 102 is started and the rotor 51 attains the predetermined rotational speed, the clutch 241 disengages from the engine 102 and the starter air valve 302 receives another command signal 107 from the aircraft controller 106 to cut off the fluid flow 307 to the air turbine starter 210.

During an operation of the DAQ 330, the power source 360 provides operating power to the DAQ controller 335 or the DAQ memory device 340, or both. The DAQ controller 335 receives or collects data related to an operation of the air turbine starter 210 from the set of starter sensors 310, the valve sensors 314, or both. For example, the set of starter sensors 310 provide the respective starter sensor signals 311 indicative of the value of the respective sensed parameters to the DAQ controller 335. The DAQ controller 335 stores the values indicated by the starter sensor signals 311 in the DAQ memory device 340. The set of valve sensors 314 provide the respective valve sensor signals 315 indicative of the value of the respective sensed parameters to the DAQ controller 335, or the aircraft controller 106, or both. The DAQ controller 335 stores the values indicated by the valve sensor signals 315 in the DAQ memory device 340. The values indicated by the starter sensor signals 311, or the valve sensor signals 315, or both, are stored in the DAQ memory device 340 and define the SO data 345.

In non-limiting aspects, the DA module 350 can perform an analysis of the SO data 345. The analysis can be conducted by the DA module 350 during an operation of the air turbine starter 210. Additionally, or alternatively, the analysis can be conducted by the DA module 350 during a flight (e.g., when the clutch 241 is disengaged from the engine 102. In non-limiting aspects, the analysis can also be conducted by the module 350, or another computing device as desired post-flight, for example during a maintenance or service operation on the air turbine starter 210.

In some aspects, the analysis can include a comparison of one or more values indicated by the starter sensor signals 311, or the valve sensor signals 315, or both, to a predetermined threshold value. In some aspects, the analysis can include determining one or more trends over time in the values indicated by the starter sensor signals 311, or the valve sensor signals 315, or both. The analysis can further include a comparison of the determined trend over time to a predetermined trend threshold. For example, the analysis can include tracking deviations of a particular parameter over time from a predetermined trend threshold. The analysis can further include a prediction of a future value of a particular parameter. The analysis can still further include a comparison of the predicted future value of the particular parameter to a predetermined threshold. In some aspects, the analysis can include correlating the values indicated by the starter sensor signals 311, or the valve sensor signals 315, or both, to each other (e.g., correlating a temperature of the air turbine starter 210 to a number of operations of the starter 210).

Based on the analysis, the DA module 350, or the DAQ controller 335, or both, can determine the presence of an undesired condition or anomaly (e.g., as indicated by an operating parameter having a value that satisfies a threshold value or range), or predict a future presence of an undesired condition or anomaly. The determined anomaly can originate from the air turbine starter 210, starter air valve 302, engine 102, or combinations thereof. For example, in one instance, the anomaly can be an irregular movement of the rotating portion (e.g., the turbine motor 221) of the air turbine starter 210 indicated by measured mechanical vibration and/or sound. This anomaly or irregularity can be indicative of a fault of a part of the air turbine starter 210. In some instances, this anomaly or irregularity can be indicative of a predicted or future fault of a part of the air turbine starter 210. In response to the determined irregular movement of the rotating portion of the air turbine starter 210, the DAQ controller 335 can provide an alert or notification 317 indicative of the anomaly with the air turbine starter 210, starter air valve 302, engine 102, or combinations thereof. The notification 317 can be provided to the aircraft controller 106. In non-limiting aspects, the aircraft controller 106 can provide a display indicative of the notification 317 on a user interface device (e.g., a screen in a cockpit of the aircraft 100).

In another non-limiting example, in one particular aspect, the DA module 350 can determine, based on the SO data 345, or a subset thereof, a current temperature of the turbine motor 221. The DA module 350 can further analyze the SO data 345 by performing an analysis including a comparison of the determined current temperature with predetermined reference data 347. In non-limiting aspects, for example, the predetermined reference data 347 can include a predetermined threshold temperature value. The predetermined threshold temperature value can be based on, without limitation, a set of predetermined operating conditions or parameters, data saved in the DAQ memory device 340, calculated values, or combinations thereof. Based on the comparison of the of the determined current temperature with the predetermined reference value, the DA module 350 can determine whether the determined current temperature of the turbine motor 221 satisfies the predetermined threshold. In the event that the determined current temperature of the turbine motor 221 satisfies the predetermined threshold, the DAQ controller 335 can be configured to trigger an alert or notification 317 to the aircraft controller 106 to indicate the current temperature of the turbine motor 221 does not satisfy the predetermined threshold. In non-limiting aspects, the aircraft controller 106 can provide a display indicative of the notification 317 on a user interface device.

Additionally, or alternatively, in the event that the DA module 350 determines the presence of an undesired condition or anomaly (e.g., as indicated by an operating parameter having a value that satisfies a threshold value or range), the DA module 350 can provide an indication of the determination to be stored in the DAQ memory device 340.

In non-limiting aspects, the DAQ memory device 340 can be a portable or removeable type memory device. In such aspects, the DAQ memory device 340 is removeable from the air turbine starter 210, and a post-flight analysis of the SO data 345 can be conducted using a separate or remote computing device configured to read and/or upload the SO data 345 from the portable DAQ memory device 340 device for analysis. In other non-limiting aspects the DAQ memory device 340 can be non-removeable from the air turbine starter 210.

The numerical examples provided herein are provided for purposes of illustration and discussion and are not intended to be limiting of the present disclosure.

Figure 4:
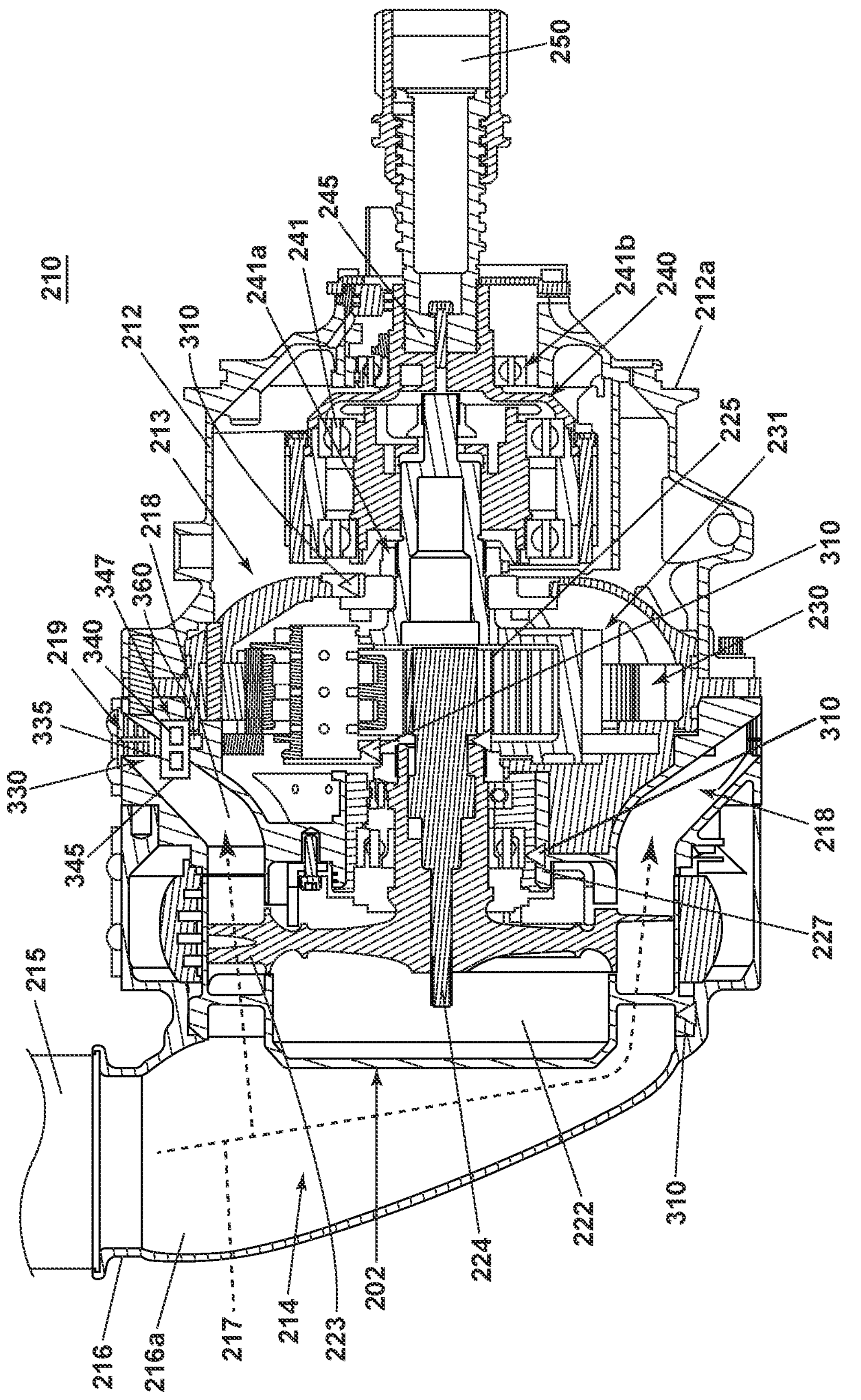
FIG. 4 depicts an isometric view in cross section of an air turbine starter having an integrated data acquisition system, in accordance with aspects as described herein.

FIG. 4 shows an exemplary air turbine starter 210 in cross section, in accordance with a non-limiting aspect. The air turbine starter 210 has a housing 212 defining a housing interior 213. Within the housing interior 213, the housing 212 includes a turbine section 220, a speed reducer section 230, and a clutch section 240. The air turbine starter 210 integrates the DAQ system 330, communicatively coupled to the set of starter sensors 310. The DAQ system 330 includes the DAQ controller 335, the power source 360, and the DAQ memory device 340. In non-limiting aspects, the DAQ system 330 can include the DA module (shown in FIG. 3).

The housing 212 defines a flow path 214 extending from an air inlet 216 fluidly coupled to an intake plenum **216*a*** through the turbine section 220, to an exhaust duct 218 fluidly coupled to an exhaust outlet 219. In non-limiting aspects, a portion of the flow path 214 can be an annular portion. The housing 212 includes a mounting flange 212*a* for mounting the air turbine starter 210 to an aircraft engine 102 (FIG. 2). An air duct 215 is coupled to the air inlet 216. The air duct 215 receives the fluid flow 307 (indicated by dashed arrows) from the starter air valve 302 (shown in FIG. 3). In other aspects, the fluid flow 307 can be from another supply.

Within the turbine section 220, the housing 212 can define the exhaust duct 218 as part of the flow path 214 downstream of the air inlet 216, and fluidly coupled to the exhaust outlet 219. The turbine section 220 can include the turbine motor 221. The turbine motor 221 includes a turbine wheel 222 coupled to a rotatable turbine shaft 224 extending therefrom. The turbine shaft 224 can be journaled by bearings 226 to the housing 212. A pinion gear 225 is coupled to the turbine shaft 224 to rotate therewith. A set of turbine blades 223 are circumferentially mounted to the turbine wheel 222 and rotatably disposed within the flow path 214. A set of non-rotatable nozzles 229 are coupled to the housing 212 within the air flow path 214 upstream of, and in fluid communication with, the turbine blades. The exhaust duct 218 is arranged downstream of the turbine motor 221 to receive the fluid flow 307 therefrom.

The speed reducer section 230 can include a speed reducer 231 such as a gear train. For example, in non-limiting aspects, the gear train can be a compound planetary gear train including a set of shafts each having a respective gear arranged to mesh with the pinion gear 225. The speed reducer 231 is rotatably coupled to the turbine shaft 224.

The clutch section 240 can include the clutch 241. The clutch 241 can include an input side 241*a* and an output side 241*b*. In non-limiting aspects, the clutch 241 can be an overrunning clutch such as a pawl and ratchet type clutch. The clutch 241 is rotatably coupled to the speed reducer 231 at the input side 241*a*, and is coupled to a clutch drive shaft 245 at the output side 241*b*. The clutch drive shaft 245 can extend beyond the housing 212. An air turbine starter output shaft 250 is coupled to the clutch drive shaft 245. The air turbine starter output shaft 250 can be coupled, for example, to a starter pad or gearbox, of the gas turbine engine (FIGS. 1 and 2).

In some aspects, the DAQ controller 335 and the DAQ memory device 340 are coupled to the housing 212 (e.g., on an inner surface of the housing 212, or on outer surface of the housing 212). In non-limiting aspects, the DAQ controller 335, the DAQ memory device 340, or both, can be disposed or contained within a DAQ enclosure 344 mounted on or fastened to the housing 212. In non-limiting aspects, the DAQ enclosure 344 can be fastened to the housing 212 via threaded fasteners. In other aspects, the DAQ enclosure 344 can be fastened using an adhesive. In still other aspects, the DAQ enclosure 344 can be formed as part of the housing 212. In some aspects, the DAQ enclosure 344 is coupled to an exterior surface of the housing 212. In still other aspects, the DAQ enclosure 344 can be mounted to any desired part of the air turbine starter 210. In some aspects, the DAQ enclosure 344 can be coupled to an inner surface of the housing 212 and disposed in the housing interior 213. For example, as illustrated, the DAQ enclosure 344 can be located within the exhaust duct 218. In non-limiting aspects, the DAQ enclosure 344 can include a thermally insulative layer 349 surrounding the DAQ controller 335, the DAQ memory device 340, or both. The thermally insulative layer 349 can surround the DAQ enclosure 344 or a portion thereof. In some aspects, the thermally insulative layer can be arranged on an exterior of the DAQ enclosure 344. In other aspects, the thermally insulative layer 349 can be disposed on an interior of the DAQ enclosure 344. In non-limiting aspects, the thermally insulative layer 349 can be integrated with the DAQ enclosure 344.

The DAQ controller 335 is communicatively coupled to the set of starter sensors 310 to receive the sensor signals 311 (shown in FIG. 3) therefrom. The set of starter sensors 310 can be located as desired on the air turbine starter 210. For example, in non-limiting aspects, at least one starter sensor 310 can be disposed on a stationary portion (e.g., the housing 212) of the air turbine starter 210 to monitor a rotating portion (e.g., the pinion gear 225) of the air turbine starter 210. In another non-limiting aspect, at least one starter sensor 310 can be disposed on a rotating portion (e.g., the pinion gear 225) of the air turbine starter 210 to monitor the rotating portion of the air turbine starter 210.

In operation, the air duct 215 can convey the fluid flow 307 to the flow path 214 in the housing interior 213 via the air inlet 216. In non-limiting aspects, pressure of the fluid flow 307 at the air inlet 216 can be in the range of 30-55 pounds per square inch gauge (psig), and the temperature of the fluid flow 307 at the air inlet 216 can be in the range of 300-400 degrees Fahrenheit (F). In other aspects, the air pressure and temperature of the fluid flow 307 at the air inlet 216 can be any desired pressure and temperature without departing from the scope of the disclosure.

The fluid flow 307 entering the housing interior 213 through the air inlet 216 is provided to and conditioned or aligned by the nozzles 229 within the flow path 214 to provide a predetermined flow angle to the fluid flow 307 and directed the fluid flow 307 to the turbine wheel 222. The fluid flow 307 is then expanded across the turbine blades 223 of the turbine wheel 222, which drives/rotates the turbine wheel 222, and is conveyed to the exhaust outlet 219 via the exhaust duct 218. As such, the temperature and pressure of the fluid flow 307 is greatly reduced. In non-limiting aspects, a pressure of the fluid flow 307 at the exhaust outlet 219 can be substantially equal to atmospheric pressure (e.g., 14.7 psig). In non-limiting aspects, the temperature of the fluid flow 307 at the exhaust outlet 219 can be in the range of 150-180 degrees F. In other aspects, the air pressure and temperature of the fluid flow 307 at the exhaust outlet 219 can be any desired pressure and temperature without departing from the scope of the disclosure. Due to the lower air pressure and temperature of the fluid flow 307 in the exhaust duct 218 as compared to the air inlet 216, in non-limiting aspects, the DAQ enclosure 344 can advantageously be disposed in the exhaust duct 218.

The turbine blades 223 of the turbine wheel 222 converts the pressure energy of the pressurized air into rotary motion causing the turbine wheel 222, the turbine shaft 224 and the pinion gear 225 to rotate at the same speed. The speed reducer 231 converts a relatively high speed, low torque rotational output of the turbine section 220 (e.g., at the turbine shaft 224) into a relatively low speed, high torque input to the clutch section 240. The clutch 241 (e.g., an over-running clutch) is rotatably driven by the speed reducer 231, thereby rotating the clutch drive shaft 245 and the air turbine starter output shaft 250 to engage with and start the gas turbine engine 10 (shown in FIG. 1).

Aspects as described herein enable operational data acquisition for an air turbine starter while reducing or eliminating the demands on the bandwidth of the communication network of the aircraft as compared to conventional techniques. One benefit of this is that retrofit and/or air turbine starters having integrated data acquisition and analytics functionality can be retrofit or added to existing aircraft more readily and at less cost than conventional starters.

Aspects as disclosed herein further enable automatic continuous or periodic data acquisition during an operation these air turbine starter components and further enable analysis of the collected data to determine any anomalies associated with the air turbine starter and provide a notification indicative of the anomaly to a controller device for the aircraft. Aspects further enable analysis of the collected data to identify trends in the data (e.g., indicative of premature wear) or to predict end of life of these components (e.g., bearings) to avoid in-field failure of the air turbine starter.

Additionally, aspects as disclosed herein can include a portable memory. One benefit of this arrangement is that a manufacturer or servicer of an air turbine starter device can more readily have performance or operational data related to the device physically available with the device itself without need to additionally or separately obtain operational data relating to the device from the aircraft computer.

To the extent not already described, the different features and structures of the various embodiments can be used in combination with each other as desired. That one feature is not illustrated in all of the embodiments is not meant to be construed that it may not be included, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

An air turbine starter system for starting an engine on an aircraft, comprising: an air turbine starter, the air turbine starter including a housing; a data acquisition (DAQ) system including: a DAQ controller coupled the housing; a DAQ memory device coupled to the housing, and communicatively coupled to the DAQ controller; and a starter sensor communicatively coupled to the DAQ controller, configured to sense an operating parameter of the air turbine starter and provide a respective starter sensor signal indicative of a value of the operating parameter to the DAQ controller, wherein the DAQ controller is configured to determine the value of the operating parameter based on the respective starter sensor signal, and to store the value in the DAQ memory device.

The air turbine starter system of the preceding clause, wherein the DAQ memory device is a portable memory device operatively removeable from the air turbine starter.

The air turbine starter system of the preceding clause, further comprising a power source disposed on the air turbine starter, and electrically coupled to the DAQ controller to provide power thereto.

The air turbine starter system of any preceding clause, wherein the power source is an electrical generator.

The air turbine starter system of any preceding clause, wherein the DAQ controller is disposed in a DAQ enclosure coupled to the air turbine starter, and wherein the DAQ enclosure includes a thermally insulative layer surrounding the DAQ controller.

The air turbine starter system of any preceding clause, wherein the housing defines a flow path extending from an air inlet upstream of a turbine motor, to an exhaust duct downstream of the turbine motor, wherein the DAQ controller is disposed within the exhaust duct.

The air turbine starter system of any preceding clause, wherein the DAQ controller further includes a data analytics module, configured to perform an analysis of a set of values stored in the DAQ memory device.

The air turbine starter system of any preceding clause, wherein the data analytics module is configured to perform the analysis during a flight of the aircraft.

The air turbine starter system of any preceding clause, wherein the data analytics module is configured to determine an anomaly associated with the air turbine starter based at least in part on the analysis.

The air turbine starter system of any preceding clause, wherein the data analytics module is configured to provide a notification indicative of the anomaly to a computerized controller device of the aircraft.

The air turbine starter system of any preceding clause, wherein the air turbine starter includes a starter air valve controllable by a computerized controller device of the aircraft, further including a valve sensor communicatively coupled to the DAQ controller configured to sense an operating parameter of the starter air valve and provide a respective valve sensor signal indicative of a value of the operating parameter to the DAQ controller, and wherein the DAQ controller is configured to determine the value of the operating parameter based on the respective valve sensor signal, and to store the value in the DAQ memory device.

An air turbine starter for starting an engine on an aircraft, comprising: a housing; a data acquisition (DAQ) system coupled to the housing, including: a DAQ controller, a memory device communicatively coupled to the DAQ controller; and a sensor communicatively coupled to the DAQ controller, configured to sense an operating parameter of the air turbine starter and provide a respective signal indicative of a value of the operating parameter to the DAQ controller; and wherein the DAQ controller is configured to determine the value of the operating parameter based on the respective signal, and to store the value in the memory device.

The air turbine starter of any preceding clause, wherein the memory device is a portable memory device operatively removeable from the air turbine starter.

The air turbine starter of any preceding clause, further comprising a power source disposed on the housing, and electrically coupled to the DAQ controller to provide power thereto.

The air turbine starter of any preceding clause, wherein the power source is an electrical generator.

The air turbine starter of any preceding clause, wherein the DAQ controller is disposed in an enclosure coupled to the air turbine starter, and wherein the enclosure includes a thermally insulative layer surrounding the DAQ controller.

The air turbine starter of any preceding clause, wherein the housing defines a flow path extending from an inlet upstream of a turbine motor, to an exhaust duct downstream of the turbine motor, wherein the DAQ controller is disposed within the exhaust duct.

The air turbine starter of any preceding clause, wherein the DAQ controller further includes a data analytics module, configured to perform an analysis of a set of values stored in the memory device.

The air turbine starter of any preceding clause, wherein the data analytics module is configured to determine an anomaly associated with the air turbine starter based at least in part on the analysis.

The air turbine starter of any preceding clause, wherein the data analytics module is configured to provide a notification indicative of the anomaly to a computerized controller device of the aircraft.

What is claimed is:

1. An air turbine starter system for starting an engine on an aircraft, comprising:
- an air turbine starter, the air turbine starter including a housing defining a flow path;
- a data acquisition (DAQ) system at least partially located within the flow path, the DAQ system including:
  - a DAQ controller; and
  - a DAQ memory device, and communicatively coupled to the DAQ controller; and
- a starter sensor communicatively coupled to the DAQ controller, configured to sense an operating parameter of the air turbine starter and provide a respective starter sensor signal indicative of a value of the operating parameter to the DAQ controller,
- wherein the DAQ controller is configured to determine the value of the operating parameter based on the respective starter sensor signal, and to store the value in the DAQ memory device.

2. The air turbine starter system of claim 1, wherein the DAQ memory device is a portable memory device operatively removeable from the air turbine starter.

3. The air turbine starter system of claim 1, further comprising a power source disposed on the air turbine starter, and electrically coupled to the DAQ controller to provide power thereto.

4. The air turbine starter system of claim 3, wherein the power source is an electrical generator.

5. The air turbine starter system of claim 1, wherein the DAQ controller is disposed in a DAQ enclosure coupled to the air turbine starter, and wherein the DAQ enclosure includes a thermally insulative layer surrounding the DAQ controller.

6. The air turbine starter system of claim 1, wherein the flow path extends from an air inlet upstream of a turbine motor, to an exhaust duct downstream of the turbine motor, wherein the DAQ controller is disposed within the exhaust duct.

7. The air turbine starter system of claim 1, wherein the DAQ controller further includes a data analytics module, configured to perform an analysis of a set of values stored in the DAQ memory device.

8. The air turbine starter system of claim 7, wherein the data analytics module is configured to perform the analysis during a flight of the aircraft.

9. The air turbine starter system of claim 7, wherein the data analytics module is configured to determine an anomaly associated with the air turbine starter based at least in part on the analysis.

10. The air turbine starter system of claim 9, wherein the data analytics module is configured to provide a notification indicative of the anomaly to a computerized controller device of the aircraft.

11. The air turbine starter system of claim 1, wherein the air turbine starter includes a starter air valve controllable by a computerized controller device of the aircraft,
- further including a valve sensor communicatively coupled to the DAQ controller configured to sense an operating parameter of the starter air valve and provide a respective valve sensor signal indicative of a value of the operating parameter to the DAQ controller, and
- wherein the DAQ controller is configured to determine the value of the operating parameter based on the respective valve sensor signal, and to store the value in the DAQ memory device.

12. An air turbine starter for starting an engine on an aircraft, comprising:
- a housing defining a flow path;
- a data acquisition (DAQ) system at least partially located within the flow path, the DAQ system including:
  - a DAQ controller, and
  - a memory device communicatively coupled to the DAQ controller; and
- a sensor communicatively coupled to the DAQ controller, configured to sense an operating parameter of the air turbine starter and provide a respective signal indicative of a value of the operating parameter to the DAQ controller;
- wherein the DAQ controller is configured to determine the value of the operating parameter based on the respective signal, and to store the value in the memory device.

13. The air turbine starter of claim 12, wherein the memory device is a portable memory device operatively removeable from the air turbine starter.

14. The air turbine starter of claim 12, further comprising a power source disposed on the housing, and electrically coupled to the DAQ controller to provide power thereto.

15. The air turbine starter of claim 14, wherein the power source is an electrical generator.

16. The air turbine starter of claim 12, wherein the DAQ controller is disposed in an enclosure coupled to the air turbine starter, and wherein the enclosure includes a thermally insulative layer surrounding the DAQ controller.

17. The air turbine starter of claim 12, wherein the flow path extends from an inlet upstream of a turbine motor, to an exhaust duct downstream of the turbine motor, wherein the DAQ controller is disposed within the exhaust duct.

18. The air turbine starter of claim 12, wherein the DAQ controller further includes a data analytics module, configured to perform an analysis of a set of values stored in the memory device.

19. The air turbine starter of claim 18, wherein the data analytics module is configured to determine an anomaly associated with the air turbine starter based at least in part on the analysis.

20. The air turbine starter of claim 9, wherein the data analytics module is configured to provide a notification indicative of the anomaly to a computerized controller device of the aircraft.

* * * * *